(12) United States Patent
Simmons et al.

(10) Patent No.: US 9,131,448 B2
(45) Date of Patent: Sep. 8, 2015

(54) STANDALONE RADIO FREQUENCY WIRELESS DEVICE HAVING DATA ACQUISITION CAPABILITIES

(75) Inventors: Michael Simmons, Chandler, AZ (US); Yifeng Yang, Chandler, AZ (US); Steven R. Bible, Chandler, AZ (US); Péter Szilveszter Kovács, Santa Clara, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 676 days.

(21) Appl. No.: 13/473,434

(22) Filed: May 16, 2012

(65) Prior Publication Data

US 2012/0309290 A1 Dec. 6, 2012

Related U.S. Application Data

(60) Provisional application No. 61/492,535, filed on Jun. 2, 2011.

(51) Int. Cl.
*H04B 1/38* (2015.01)
*H04B 7/14* (2006.01)
*H04W 52/02* (2009.01)
*H04B 1/40* (2015.01)

(52) U.S. Cl.
CPC ............. *H04W 52/0251* (2013.01); *H04B 1/40* (2013.01)

(58) Field of Classification Search
CPC .................................................. H04W 52/0251
See application file for complete search history.

(56) References Cited

U.S. PATENT DOCUMENTS

| | | | | |
|---|---|---|---|---|
| 2002/0112070 A1* | 8/2002 | Ellerbrock et al. | ........... | 709/238 |
| 2006/0002495 A1* | 1/2006 | Shirakawa et al. | ........... | 375/345 |
| 2007/0273549 A1* | 11/2007 | Jackson et al. | ........... | 340/870.02 |
| 2009/0116462 A1 | 5/2009 | Powell et al. | ................. | 370/338 |
| 2009/0168849 A1 | 7/2009 | Rouxel | ........... | 375/140 |
| 2011/0248846 A1* | 10/2011 | Belov et al. | ................. | 340/539.1 |
| 2012/0170482 A1* | 7/2012 | Hwang et al. | ................. | 370/252 |

FOREIGN PATENT DOCUMENTS

WO 02/19293 A2 3/2002 ............. G01D 21/00
WO 2007/101141 A2 9/2007

OTHER PUBLICATIONS

Bogliolo, A., et al., "Specification and Analysis of Power-Managed Systems", Proceedings of the IEEE, vol. 92, No. 8; pp. 1308-1346, Aug. 2004.
Vladimirova, T., et al., "Space-Based Wireless Sensor Networks: Design Issues", Aerospace Conference, IEEE, XP031657397, pp. 1-14, Mar. 6, 2010.
Invitation to Pay Additional Fees and, Where Applicable, Protest Fee; PCT/US2012/040163, 9 pages, Oct. 19, 2012.
International Search Report and Written Opinion, Application No. PCT/US2012/040163, 18 pages, Jul. 15, 2013.

* cited by examiner

*Primary Examiner* — Yuwen Pan
*Assistant Examiner* — Fanghwa Wang
(74) *Attorney, Agent, or Firm* — Slayden Grubert Beard PLLC

(57) ABSTRACT

An inexpensive and low-power demand RF wireless device having data acquisition capabilities may be used for simple applications such as a standalone data repeater or a standalone data acquisition node without requiring a host microcontroller unit (MCU) or programmable logic for control of the wireless device.

17 Claims, 2 Drawing Sheets

STANDALONE RADIO FREQUENCY WIRELESS DEVICE HAVING DATA ACQUISITION CAPABILITIES

RELATED PATENT APPLICATION

This application claims priority to commonly owned U.S. Provisional Patent Application Ser. No. 61/492,535; filed Jun. 2, 2011; entitled "Standalone Radio Frequency Transceiver Having Data Acquisition Capabilities," by Michael Simmons, Yifeng Yang, Steven R. Bible and Péter Szilveszter Kovács; which is hereby incorporated by reference herein for all purposes.

TECHNICAL FIELD

The present disclosure relates to radio frequency repeaters and wireless nodes, and, more particularly, to standalone radio frequency wireless repeaters and data-acquisition nodes.

BACKGROUND

A typical wireless node includes a radio frequency (RF) transceiver and a host microcontroller unit (MCU) or programmable logic to control the RF transceiver. Requiring a MCU or programmable logic in combination with the RF transceiver increases cost to manufacture, device board or die space, and shortens battery operating life because of increased power demand of the MCU (or programmable logic) in combination with the RF transceiver.

SUMMARY

What is needed is an inexpensive and low-power demand RF wireless device having data acquisition capabilities that may be used for simple applications such as a standalone repeater or as a standalone data acquisition node without requiring a MCU.

According to an embodiment. a wireless data acquisition device may comprises: a radio frequency transceiver; a sensor external connection; a receive analog-to-digital converter (ADC); an analog signal multiplexer having a first input coupled to the sensor external connection, a second input coupled to an analog output of the radio frequency transceiver, and an output coupled to the receive ADC; a transmit digital-to-analog converter (DAC) coupled to an analog input of the radio frequency transceiver; baseband signal decoding and encoding logic coupled to an output of the receive ADC and an input of the transmit DAC, respectively; media access control (MAC) logic coupled to the baseband signal decoding and encoding logic; a communications interface coupled to the MAC logic and to one of a plurality of external connections; a state machine coupled to the radio frequency transceiver, baseband signal decoding and encoding logic, the MAC logic, and a control input of the analog signal multiplexer; and configuration storage coupled to the state machine and to another one of the plurality of external connections; wherein the state machine uses configuration information stored in the configuration storage to configure operation of the radio frequency transceiver, baseband signal decoding and encoding logic, and the MAC logic.

According to a further embodiment, a timer may be coupled to the state machine. According to a further embodiment, the configuration storage is selected from the group consisting of non-volatile memory, one-time programmable (OTP) memory, and electrically erasable programmable read only memory (EEPROM). According to a further embodiment, the communications interface comprises a serial peripheral interface (SPI). According to a further embodiment, the communications interface is selected from the group consisting of an inter-integrated circuit ($I^2C$) interface, and a universal asynchronous receiver/transmitter (UART). According to a further embodiment, the state machine wakes up the radio frequency transceiver from a low power sleep mode when a signal is detected at the sensor external connection. According to a further embodiment, the state machine wakes up the radio frequency transceiver from a low power sleep mode when a wake-up signal is asserted from the timer.

According to a further embodiment, a received signal strength indicator analog-to-digital converter (RSSI ADC) is provided. According to a further embodiment, a second analog signal multiplexer is coupled between the RSSI ADC and another sensor external connection is provided. According to a further embodiment, configuration data is stored in the configuration storage. According to a further embodiment, the configuration data is selected from one or more of the group consisting of a channel frequency, a data rate, a data acquiring period, an identification, and a wake-up interval. According to a further embodiment, a repeater function is provided wherein the radio frequency transceiver receives data and then retransmits the received data.

According to a further embodiment, an interrupt input of the state machine is coupled to a yet another one of the plurality of external connections, wherein when an interrupt signal is received at the interrupt input of the state machine the analog signal multiplexer couples the sensor external connection to the input of the receive ADC, the receive ADC converts a sample of a signal from the sensor external connection to a digital value representative thereof, and then the radio frequency transceiver transmits the digital value.

According to another embodiment, a wireless data repeater device may comprise: a radio frequency transceiver; a receive analog-to-digital converter (ADC) coupled to an analog output of the radio frequency transceiver; a transmit digital-to-analog converter (DAC) coupled to an analog input of the radio frequency transceiver; baseband signal decoding and encoding logic coupled to an output of the receive ADC and an input of the transmit DAC, respectively; media access control (MAC) logic coupled to the baseband signal decoding and encoding logic; a communications interface coupled to the MAC logic and to one of a plurality of external connections; a state machine coupled to the radio frequency transceiver, baseband signal decoding and encoding logic, the MAC logic, and a control input of the analog signal multiplexer; and configuration storage coupled to the state machine and to another one of the plurality of external connections; wherein the state machine uses configuration information stored in the configuration storage to configure operation of the radio frequency transceiver, baseband signal decoding and encoding logic, and the MAC logic.

According to a further embodiment, the configuration storage is selected from the group consisting of non-volatile memory, one-time programmable (OTP) memory, and electrically erasable programmable read only memory (EEPROM). According to a further embodiment, the state machine wakes up the radio frequency transceiver from a low power sleep mode when a data signal is received and then the radio frequency transceiver retransmits received data signal. According to a further embodiment, configuration data is stored in the configuration storage. According to a further embodiment, the configuration data is selected from one or more of the group consisting of a channel frequency, a data rate, an identification, and a wake-up interval.

BRIEF DESCRIPTION OF THE DRAWINGS

A more complete understanding of the present disclosure may be acquired by referring to the following description taken in conjunction with the accompanying drawings wherein.

Figure 1:
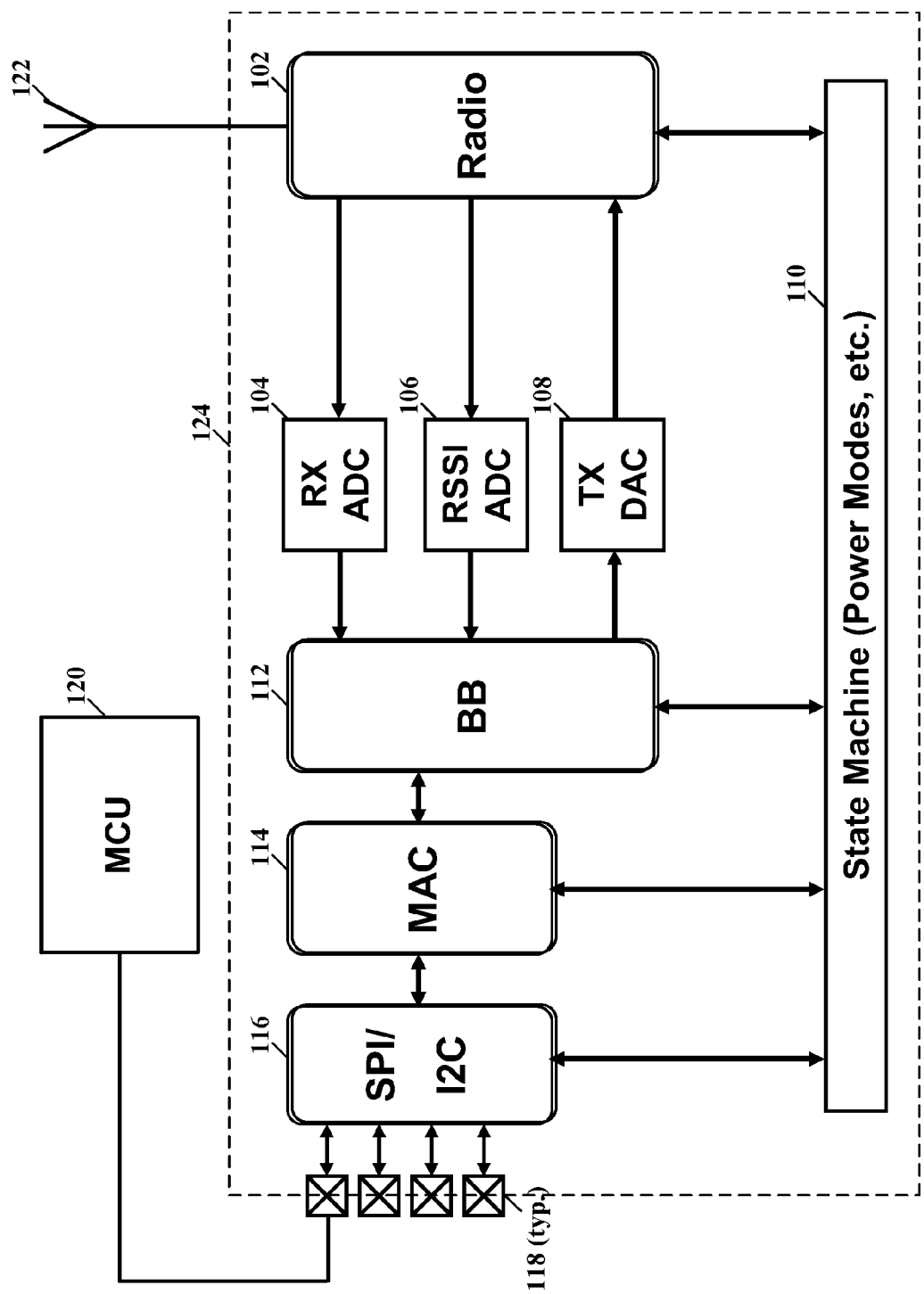
FIG. 1 illustrates a schematic block diagram of a typical prior art wireless device architecture used with a microcontroller unit (MCU)

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A microcontroller unit (MCU) may be defined as a host microcontroller or programmable logic having non-volatile program memory. The MCU's tasks may be taken over by a minimal addition of logic implemented in the RF transceiver logic, according to the teachings of this disclosure. By eliminating the MCU, energy consumption is lowered, e.g., an MCU may consume 30-50% percent of total energy in a typical wireless node. A standalone RF wireless device can operate faster without the overhead of being controlled by the MCU. All of these factors benefit battery life (e.g., battery life may be doubled).

The standalone RF wireless device may also be used as standalone repeater to forward a received message to extend the range of a wireless network, and is a cost sensitive application such as the standalone repeater. Leaf nodes of a Wireless Sensor Network (WSN), e.g., largest number of nodes in the WSN are also a cost sensitive application. A leaf node is used to periodically transmit acquired sensor data.

Referring now to the drawing, the details of a specific example embodiment is schematically illustrated. Like elements in the drawings will be represented by like numbers, and similar elements will be represented by like numbers with a different lower case letter suffix.

Referring to FIG. 1, depicted is a schematic block diagram of a typical prior art wireless device architecture used with a micro-control unit (MCU). The wireless device may comprise a radio frequency transceiver 102, a receive analog-to-digital converter (ADC) 104, a received signal strength indicator (RSSI) ADC 106, transmit digital-to-analog converter (DAC) 108, a state machine 110, baseband (BB) decoding (receive) and encoding (transmit) logic 112, media access control (MAC) logic 114, a communications interface 116, e.g., serial peripheral interface (SPI) and/or an inter-integrated circuit ($I^2C$) interface(s), and a plurality of input-output (I/O) connections 118. The MCU 120 is coupled to the transceiver at an I/O connection 118 and communicates therewith through the communications interface 116. The MCU 120 controls the operation of the wireless transceiver with a program stored in a non-volatile memory (not shown) of the MCU 120. The wireless device may be fabricated on an integrated circuit 124 and the RF transceiver 102 is coupled to an antenna 122. Using the MCU 120 and non-volatile memory (not shown) requires power and thus reduces battery operating time that could otherwise be used to extend the operation of the wireless transceiver.

Figure 2:
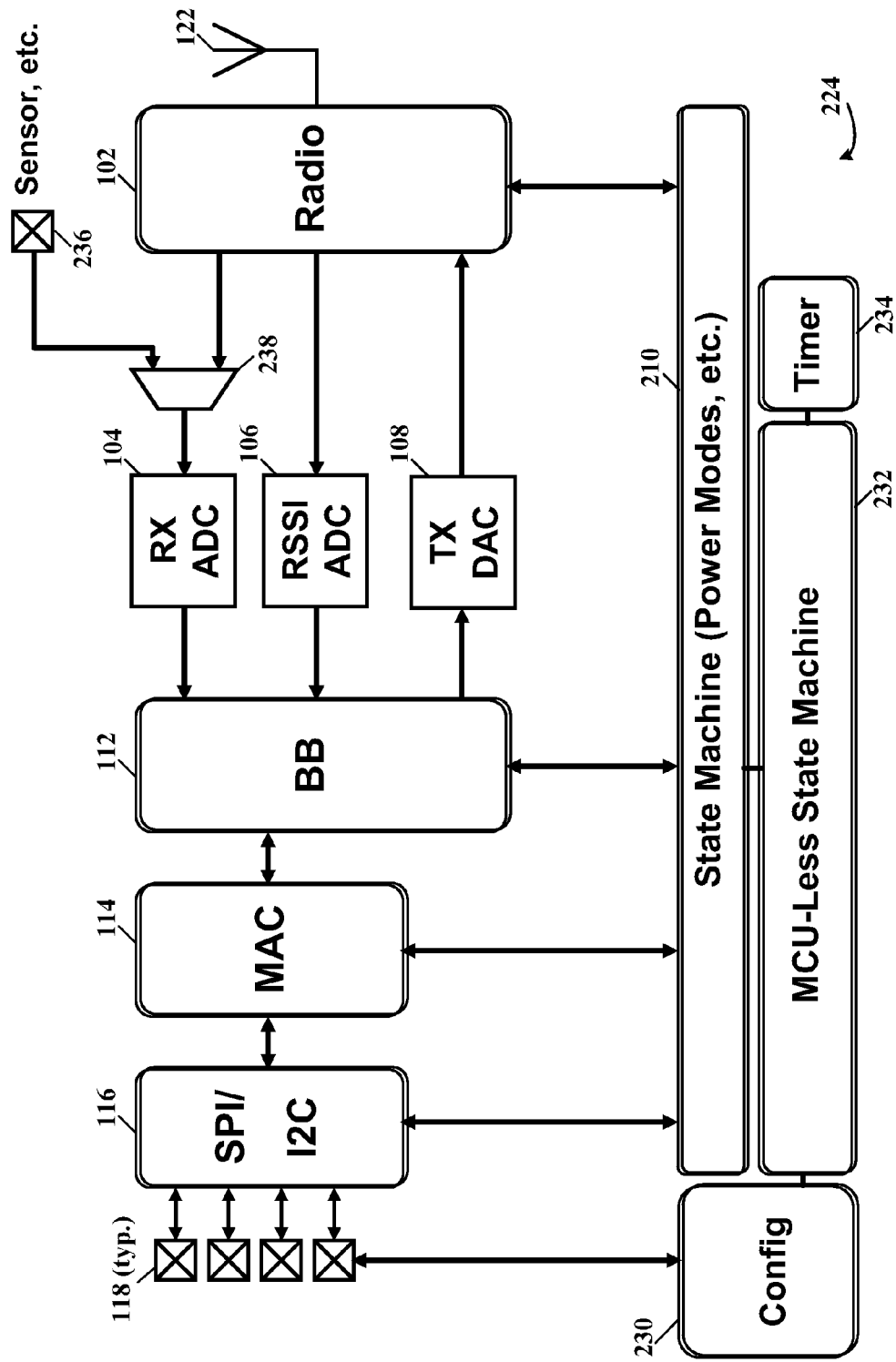
FIG. 2 illustrates a schematic block diagram of a standalone wireless device architecture not requiring a microcontroller unit (MCU), according to a specific example embodiment of this disclosure.

Referring now to FIG. 2, depicted is a schematic block diagram of a standalone wireless device architecture not requiring a micro-control unit (MCU), according to a specific example embodiment of this disclosure. The standalone wireless device may comprise a radio frequency transceiver 102, a receive analog-to-digital converter (ADC) 104, a received signal strength indicator (RSSI) ADC 106, transmit digital-to-analog converter (DAC) 108, a state machine 210, baseband (BB) decoding (receive) and encoding (transmit) logic 112, media access control (MAC) logic 114, a communications interface 116, e.g., serial peripheral interface (SPI) and/or an inter-integrated circuit ($I^2C$) interface(s), and a plurality of input-output (I/O) connections 118. In addition, an analog multiplexer 238, a MCU-less state machine 232 and a timer 234 may be added to the aforementioned functions of the wireless transceiver to make it MCU independent. The analog multiplexer 238 has a control input (not shown) coupled to and is controlled by the MCU-less state machine 232. Configuration storage 230 may be programmed used during manufacture of the wireless transceiver or in the field and programmed for specific applications. The MCU-less state machine 232 may use the configuration programmed into the configuration storage 230.

A configuration for the MCU-less wireless transceiver may be stored in the configuration storage 230 and may be, for example is but not limited to, various radio parameters, e.g., channel frequency, data rate, data acquiring period, identification, wake-up interval, etc., through the use of external the connections 118, on-chip non-volatile memory (not shown), etc. The MCU-less RF device may use any one or more of the input/output (I/O) connections 118 (hardware configuration), on-chip one-time programmable (OTP) memory (not shown), and/or off-chip electrically erasable programmable read only memory (EEPROM) (not shown) with a SPI/$I^2C$/etc. communicating master (not shown).

External sensor/transducer/etc., data acquisition may be done with either or both of the receive and/or RSSI ADCs 104 and/or 106 (not required for repeater applications). Using the ADC (receive or RSSI ADC) through the multiplexer 238 will increase accuracy and performance with an existing on-chip ADC internal to the RF transceiver integrated circuit and add the ability to sample from an external connection 236. Since transmitting acquired data is the primarily interest, re-using the receive ADC 104 and/or the RSSI ADC 106 will not present a problem for application and operation of the MCU-less RF transceiver described herein.

The function of the timer 234 may be simple or complex and provides the ability to periodically wake up on-chip logic (e.g., state machines 210 and/or 232) of the MCU-less RF transceiver for the purpose of data acquisition from an external (off-chip) source and subsequent data transmission from the wireless transceiver. This represents a "polling" mode of data acquisition, useful for acquiring measurements of temperature, pressure, fluid level, etc., that may be sampled periodically and the values thereof broadcast to the WSN (not required for repeater applications). RF transceivers generally have a sleep timer present that may also be used for sampling of an external sensor (analog or digital).

External wake-up input (not explicitly shown in FIG. 2 but is contemplated herein and may be part of the MCU-less state machine 232) would allow an off-chip source to specify when data is ready to be acquired, rather then relying upon the wake-up timer 234. This represents an "interrupt" mode of data acquisition, useful for data acquisition based upon an event, e.g., wake-up and acquire data when a door is opened.

The MCU-less state machine 232 performs a predefined set of steps, which may be particular to a radio protocol, such as wake-up, then acquire the data, then format the data into a frame format, then transmit the frame containing the data, then go back to sleep (low power mode). The packet format(s) is determined in the hardware logic of the RF transceiver and is not easily modified once the logic is designed.

The data acquisition interface, e.g., RX ADC 104 shown in FIG. 2, may comprise one or more "standard" interfaces to off-chip sources, such as for example but is not limited to an analog interface (ADC) and/or a digital interface (I²C, SPI, universal asynchronous receiver/transmitter (UART), etc.). Control of the data acquisition interface may be performed by the MCU-less state machine 232. As shown in FIG. 2, reuse of an existing ADC (receive ADC 104 or RSSI ADC 106) may be used to implement an analog acquisition interface without having to implement additional hardware by merely adding the multiplexer 238 between the ADC 104 or 106 and the external analog input at connection 236.

The standalone wireless device shown in FIG. 2 may be fabricated on an integrated circuit die 224 and packaged in an integrated circuit package (not shown). An antenna 122 is coupled to the RF transceiver 102.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A wireless data acquisition device, comprising:
    a radio frequency transceiver;
    a sensor external connection;
    a receive analog-to-digital converter (ADC);
    an analog signal multiplexer having a first input coupled to the sensor external connection, a second input coupled to an analog output of the radio frequency transceiver, and an output coupled to the receive ADC;
    a transmit digital-to-analog converter (DAC) coupled to an analog input of the radio frequency transceiver;
    baseband signal decoding and encoding logic coupled to an output of the receive ADC and an input of the transmit DAC, respectively;
    media access control (MAC) logic coupled to the baseband signal decoding and encoding logic;
    a communications interface coupled to the MAC logic and to one of a plurality of external connections;
    a state machine coupled to the radio frequency transceiver, baseband signal decoding and encoding logic, the MAC logic, and a control input of the analog signal multiplexer;
    configuration storage coupled to the state machine and to another one of the plurality of external connections;
    wherein the state machine uses configuration information stored in the configuration storage to configure operation of the radio frequency transceiver, baseband signal decoding and encoding logic, analog signal multiplexer and the MAC logic, the state machine being used in place of a microcontroller;
    a timer coupled to the state machine.

2. The wireless data acquisition device according to claim 1, wherein the configuration storage is selected from the non-transitory memory group consisting of non-volatile memory, one-time programmable (OTP) memory, and electrically erasable programmable read only memory (EEPROM).

3. The wireless data acquisition device according to claim 1, wherein the communications interface comprises a serial peripheral interface (SPI).

4. The wireless data acquisition device according to claim 1, wherein the communications interface is selected from the group consisting of an inter-integrated circuit (I²C) interface, and a universal asynchronous receiver/transmitter (UART).

5. The wireless data acquisition device according to claim 1, wherein the state machine wakes up the radio frequency transceiver from a low power sleep mode when a signal is detected at the sensor external connection.

6. The wireless data acquisition device according to claim 1, wherein the state machine wakes up the radio frequency transceiver from a low power sleep mode when a wake-up signal is asserted from the timer.

7. The wireless data acquisition device according to claim 1, further comprising a received signal strength indicator analog-to-digital converter (RSSI ADC).

8. The wireless data acquisition device according to claim 7, further comprising a second analog signal multiplexer coupled between the RSSI ADC and another sensor external connection.

9. The wireless data acquisition device according to claim 1, wherein configuration data is stored in the configuration storage.

10. The wireless data acquisition device according to claim 9, wherein the configuration data is selected from one or more of the group consisting of a channel frequency, a data rate, a data acquiring period, an identification, and a wake-up interval.

11. The wireless data acquisition device according to claim 1, further comprising a repeater function wherein the radio frequency transceiver receives data and then retransmits the received data.

12. The wireless data acquisition device according to claim 1, further comprising an interrupt input of the state machine coupled to a yet another one of the plurality of external connections, wherein when an interrupt signal is received at the interrupt input of the state machine the analog signal multiplexer couples the sensor external connection to the input of the receive ADC, the receive ADC converts a sample of a signal from the sensor external connection to a digital value representative thereof, and then the radio frequency transceiver transmits the digital value.

13. A wireless data repeater device, comprising:
    a radio frequency transceiver;
    a receive analog-to-digital converter (ADC) coupled to an analog output of the radio frequency transceiver;
    a transmit digital-to-analog converter (DAC) coupled to an analog input of the radio frequency transceiver;
    baseband signal decoding and encoding logic coupled to an output of the receive ADC and an input of the transmit DAC, respectively;
    media access control (MAC) logic coupled to the baseband signal decoding and encoding logic;
    a communications interface coupled to the MAC logic and to one of a plurality of external connections;
    a state machine coupled to the radio frequency transceiver, baseband signal decoding and encoding logic, the MAC logic, and a control input of the analog signal multiplexer; and configuration storage coupled to the state machine and to another one of the plurality of external connections;

wherein the state machine uses configuration information stored in the configuration storage to configure operation of the radio frequency transceiver, baseband signal decoding and encoding logic, analog signal multiplexer and the MAC logic, the state machine being used in place of a microcontroller; and a timer coupled to the state machine.

14. The wireless data repeater device according to claim 13, wherein the configuration storage is selected from the non-transitory memory group consisting of non-volatile memory, one-time programmable (OTP) memory, and electrically erasable programmable read only memory (EEPROM).

15. The wireless data repeater device according to claim 13, wherein the state machine wakes up the radio frequency transceiver from a low power sleep mode when a data signal is received and then the radio frequency transceiver retransmits received data signal.

16. The wireless data repeater device according to claim 13, wherein configuration data is stored in the configuration storage.

17. The wireless data repeater device according to claim 16, wherein the configuration data is selected from one or more of the group consisting of a channel frequency, a data rate, an identification, and a wake-up interval.

* * * * *